United States Patent [19]

Fujiwara

[11] Patent Number: 5,440,728
[45] Date of Patent: Aug. 8, 1995

[54] INFORMATION PROCESSING APPARATUS

[75] Inventor: Yoshifumi Fujiwara, Tokyo, Japan

[73] Assignee: NEC Corporation, Tokyo, Japan

[21] Appl. No.: 292,046

[22] Filed: Aug. 18, 1994

Related U.S. Application Data

[63] Continuation of Ser. No. 700,429, May 15, 1991, abandoned.

[30] Foreign Application Priority Data

May 18, 1990 [JP] Japan .................................. 2-129560

[51] Int. Cl.$^6$ .................................. G06F 11/34
[52] U.S. Cl. .................................. 395/419; 395/182.06; 395/182.08
[58] Field of Search .................................. 395/575; 371/9.1; 364/230, 230.5, 228.1, 285, 976.1, 942.3

[56] References Cited

U.S. PATENT DOCUMENTS

| | | | |
|---|---|---|---|
| 4,253,146 | 2/1981 | Bellamy et al. | 364/200 |
| 4,400,775 | 8/1983 | Nozaki et al. | 364/200 |
| 4,670,835 | 6/1987 | Kelly et al. | 395/575 |
| 4,985,825 | 1/1991 | Webb, Jr. et al. | 395/575 |
| 5,339,408 | 8/1994 | Bruckert et al. | 395/575 |

FOREIGN PATENT DOCUMENTS 0071002  2/1983  European Pat. Off. .

Primary Examiner—Robert W. Beausoliel, Jr.
Assistant Examiner—Trinh Tu
Attorney, Agent, or Firm—Foley & Lardner

[57] ABSTRACT

An information processing apparatus includes a plurality of processors, a memory unit, a plurality of address conversion tables, an address conversion table managing unit, an address conversion table control unit, a processor managing unit, and an abnormality processing unit. The processors perform arithmetic operations for information processing. The memory unit is accessed commonly by the processors. The address conversion tables convert a logic address into a physical address. The address conversion table managing unit has directories for managing the address conversion tables in accordance with contents of the logic address and Nos. of processors accessible to the address conversion tables. The address conversion table control unit updates the address conversion table managing unit to update contents of the address conversion tables. The processor managing unit checks whether each processor is operable. The abnormality processing unit performs processing for deleting a specific processor No. from a directory of the address conversion table managing unit in accordance with abnormality information from the processors.

9 Claims, 6 Drawing Sheets

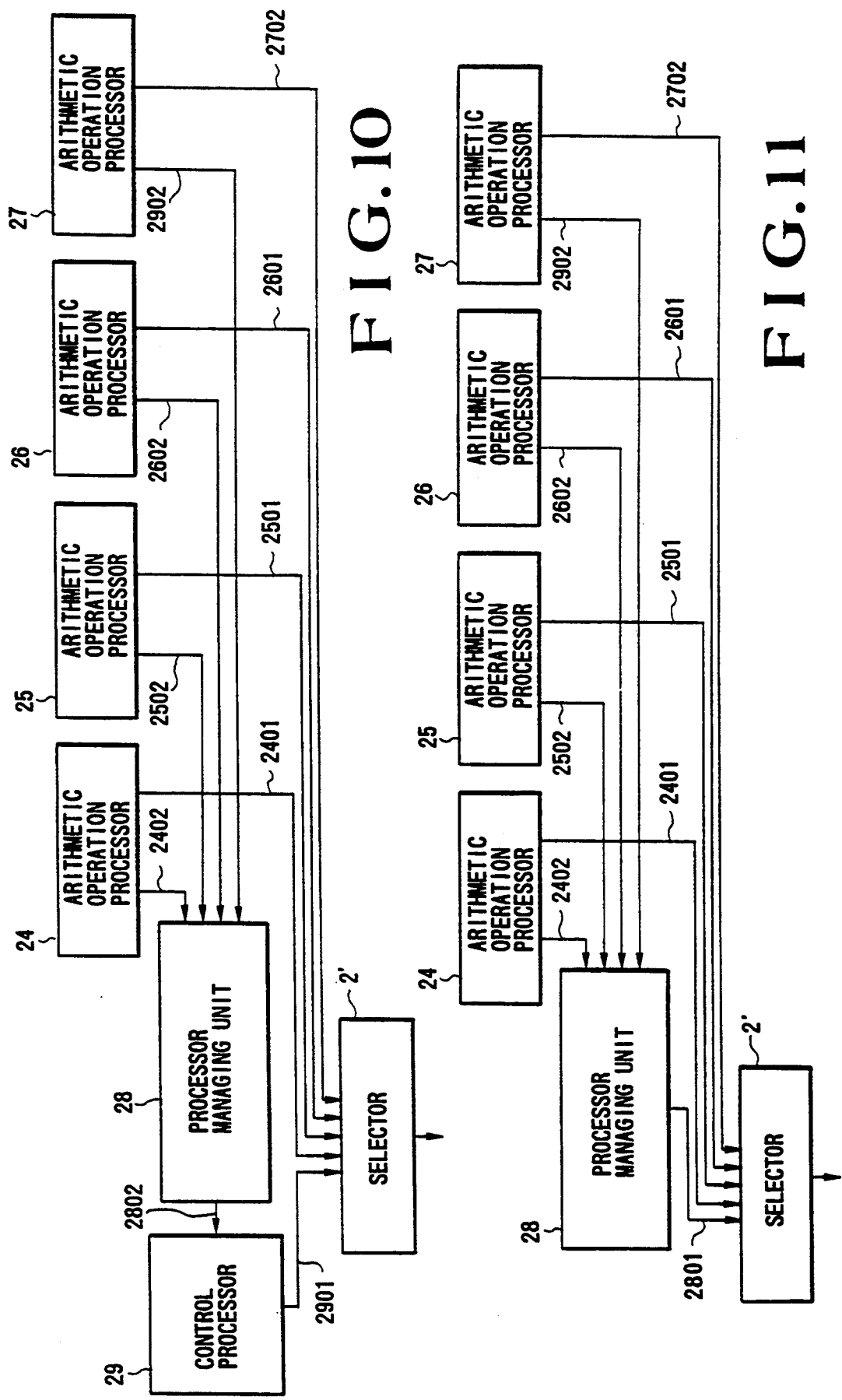

INFORMATION PROCESSING APPARATUS

This application is a continuation of application Ser. No. 07/700,429, filed May 15, 1991, now abandoned.

BACKGROUND OF THE INVENTION

The present invention relates to an information processing apparatus and, more particularly, to directory management of an address conversion table upon a processor failure in a multiprocessor arrangement.

A conventional information processing apparatus of this type has an arrangement as shown in a block diagram of FIG. 2. In this arrangement, in order to allow an arithmetic operation processor 24 to access a main memory unit 1, the arithmetic operation processor 24 sends a request code, a logic address, and a processor number (hereinafter 'No.") through a line 2401 and sets them in a register 3 via a selector 2.

The register 3 sends the request code to a control unit 20 through a line 305 and sends a partial space No. of the logic address and the processor No. to comparing units 12 to 15 through a line 301. The comparing units 12 to 15 compare the partial space No. from the line 301 with partial space Nos. of directories 4 to 7, respectively, and compare the processor No. from the line 301 with processor numbers (hereinafter "Nos.") of the directories 4 to 7, respectively. If any of the comparing units 12 to 15 finds a coincidence, it reports this coincidence to the control unit through a corresponding one of lines 1201, 1301, 1401, and 1501. The directory 4 is paired to an address converting unit 16, and the directories 5 to 7 are paired to address converting units 17 to 19, respectively. As shown in FIG. 3, each of the directories 4 to 7 holds four bits of processor No. in one-to-one correspondence to arithmetic operation processors 24 to 27 and a partial space No. corresponding to the partial space No. of the logic address of the register 3. This logic address has 30 bits constituted by 10 bits of a partial space No., 10 bits of a page No., and 10 bits of an intrapage address, as shown in FIG. 4.

The page No. of the logic address from the register 3 is supplied to the address converting units 16 to 19 through a line 302. The address converting units 16 to 19 read out addresses from corresponding tables and send the readout addresses to a selector 21 through lines 1601, 1701, 1801, and 1901.

When the control unit 20 receives the request code from the register 3 through the line 305 and determines access to the memory unit 1, it checks the coincidence results from the line 1201, 1301, 1401, and 1501. The control unit 20 controls the selector 21 through a line 2001 so as to select an address of one of the address converting units 16 to 19 corresponding to one of the comparing units 12 to 15, which outputs the coincidence, and sets the address in a register 22 through a line 2101. At the same time, the control unit 20 sets the intrapage address of the register 3 in the register 22 through a line 304. As a result, since the logic address of the register 3 is set as a physical address in the register 22, access to the memory unit 1 is performed through a line 2201.

Registration of address conversion tables in the directories 4 to 7 and the address converting units 16 to 19 will be described below.

In order to load an address conversion table having partial space No. "20" from the arithmetic operation processor 25, the selector 2 selects a processor No., the partial space No. "20", and a logic address together with a request code from the arithmetic operation processor 25 through a line 2501 and sets them in the register 3. The format of the register 3 is shown in FIG. 5. Referring to FIG. 5, this partial space No. indicates a partial space No. located in the same bit position as that of the partial space No. but to be registered in an address conversion table and is different from a current logic address. The current logic address indicates a read start address of an address conversion table to be registered from the memory unit 1 into the address converting units 16 to 19. In access to the memory unit 1 at this time, no address conversion is performed. Therefore, as an address to be used in access to the memory unit 1 for an address conversion table read operation, the logic address of the register 3 is directly set in the register 22 such that the partial space No. and the page No. of the logic address are selected by the selector 21 through the line 303 and set in the register 22 and the intrapage address of the logic address is set in the register 22 through the line 304, thereby reading out the address conversion table from the memory unit 1. In accordance with the format of the logic address, information of 1,024 pages corresponding to 10 bits of the page No. is read out for each partial space from the memory unit 1. All of these addresses are generated on the arithmetic processor side to constantly set only the logic address in the register 3.

When the control unit 20 determines in accordance with the request code from the register 3 that registration processing of an address conversion table into the address converting units 16 to 19 is to be performed, it causes the comparing units 12 to 15 to check whether any one of the directories 4 to 7 is nonused. The comparing unit 12 has an arrangement as shown in FIG. 6, and each of the comparing units 13 to 15 has the same arrangement. Referring to FIG. 6, the controller 20 controls a selector 1210 to select "0" and compares "0" with a processor No. from the directory 4. A comparator 1211 is used to check a coincidence between the processor No. of the register 3 and that of the directory 4. In this case, the coincidence between the value "0" from the selector 1210 and the processor No. from the directory 4 indicates that all bits (bits 0 to 3 shown in FIG. 3) of the processor No. from the directory 4 are "0"s and the directory 4 is nonused. The result from the comparator 1211 is selected by a selector 1214 and supplied to the control unit 20 through the line 1201. Note that a comparator 1212 is used to check a coincidence between the partial space No. of the logic address of the register 3 and that of the directory 4 in a normal access mode to the memory unit 1. In this case, the results of the comparators 1211 and 1212 are ANDed by an AND gate 1213, and the resultant logical product is selected by the selector 1214 and supplied to the line 1201. The control unit 20 designates the same processing for the comparing units 13 to 15 and receives the results through the lines 1301, 1401, and 1501. In this case, assume that the directory 4 is nonused.

When the control unit 20 determines through the line 1201 that the directory 4 is nonused, it sets the processor No. (in this case, "0100" is set because the request is output from the arithmetic operation processor 25) and the partial space No. ("0000010100" is set as "20" of bits 20 to 29 shown in FIG. 5) of the register 3 in the directory 4. In addition, the address conversion table read out from the memory unit 1 is set in a register 8 through the line 101. The register 8 receives address conversion table information from the memory unit 1 in each machine cycle and sends the information to the address converting unit 16.

The address converting unit 16 has an arrangement as shown in FIG. 7. When data is set in the register 8, "0" is set in a count register 1610. The value "0" is selected by a selector 1611 and supplied as a write address to an address conversion table 1612, thereby writing the address conversion table information from the register 8. A value incremented by "1" is set in the count register 1610 in each machine cycle.

The address converting units 17 to 19 have the same arrangement as that of the address converting unit 16.

Deletion of registration from the directories 4 to 7 and the address converting units 16 to 19 will be described below. The deletion as processing is performed by resetting the processor Nos. of the directories 4 to 7. Assuming that the processor Nos. and the partial space Nos. of the directories 4, 5, 6, and 7 are "1000" "0000000001", "1000" and "0000001111", "0010" and "0000000001", and "0001" and "0000000001", respectively, an operation of clearing an address converting unit having the partial space No. "0000000001" from the arithmetic operation processor 24 will be described below.

The arithmetic operation processor 24 sets a request code, a partial space No., and a processor No. in bits 0 to 29 of the register 3 via the selector 2 through the line 2401. When the register 3 sends an instruction code to the control unit 20, the control unit 20 sends the processor No. "1000" and the partial space No. "0000000001" to the comparators 12 to 15 through the line 301 in order to delete a table of a corresponding one of the address converting units 16 to 19, i.e., to delete the processor No. from a corresponding one of the directories 4 to 7. The comparators 12 to 15 check whether the processor No. and the partial space No. from the line 301 coincide with the processor Nos. and the partial space Nos. of the directories 4 to 7, respectively. In this case, since a coincidence is obtained with respect to the contents of the directory 4, this coincidence is reported through the line 1201. Therefore, the control unit 20 sets "0000" as the processor No. of the directory 4 and ends the processing.

In the above conventional information processing apparatus, each arithmetic operation processor loads a corresponding necessary address conversion table into an address converting unit and issues an instruction for deleting the table when the table becomes unnecessary. Therefore, if an arithmetic operation processor using an address conversion table goes down by abnormality without clearing the address conversion table, then an address conversion table in use cannot be cleared and is left occupied. As a result, part of the address conversion tables become unusable, all of which could have been used originally. This causes a decrease in the use efficiency of the address conversion tables, a frequent need to perform a process for registration of the remaining address conversion tables, increased overhead, and an overall reduction in system performance.

SUMMARY OF THE INVENTION

It is, therefore, a principal object of the present invention to provide an information processing apparatus capable of preventing the use efficiency of address conversion tables even if a processor using an address conversion table goes down.

It is another object of the present invention to provide an information processing apparatus capable of preventing an increase in registration of address conversion tables even if a processor using an address conversion table goes down, thereby preventing production of an overhead.

It is still another object of the present invention to provide an information processing apparatus not causing a reduction in system performance even if an abnormality occurs.

In order to achieve the above objects, according to one aspect of the present invention, there is provided an information processing apparatus comprising a plurality of processors for performing arithmetic operations for information processing, a memory unit to be accessed commonly by the processors, a plurality of address conversion tables for converting a logic address into a physical address, address conversion table managing means having directories for managing the address conversion tables in accordance with contents of the logic address and Nos. of processors accessible to the address conversion tables, address conversion table control means for updating the address conversion table managing means to update contents of the address conversion tables, processor managing means for checking whether each processor is operable, and abnormality processing means for performing processing for deleting a specific processor No. from a directory of the address conversion table managing means in accordance with abnormality information from the processors.

According to another aspect of the present invention, there is provided an information processing apparatus comprising a plurality of processors for performing arithmetic operations for information processing, a memory unit to be commonly accessed by the processors, a plurality of address conversion tables for converting a logic address constituted by a partial space No., a page No., and an intrapage address into a physical address, address conversion table managing means including directories in correspondence with the address conversion tables, the directories managing the address conversion tables in accordance with the partial space No. of the logic address and an accessible processor designation bit indicating a processor accessible to the address conversion tables, address conversion table control means for updating the address conversion table managing means to update contents of the address conversion tables, processor managing means for checking whether each processor is operable, forced clear designating means for designating one of the accessible processors designated by the processor managing means to delete a specific processor No. from the address conversion table managing means in accordance with abnormality information from the processors, and forced control means for causing one of the operable processors to issue a directory clear request to the address conversion table control means in accordance with the designation from the forced clear designating means.

According to still another aspect of the present invention, there is provided an information processing apparatus comprising a plurality of processors for performing arithmetic operations for information processing, a memory unit to be commonly accessed by the processors, a plurality of address conversion tables for converting a logic address constituted by a partial space No., a page No., and an intrapage address into a physical address, address conversion table managing means having directories in correspondence with the address conversion tables, the directories managing the address conversion tables by a partial space No. of the logic address and an accessible processor designation bit indicating processors accessible to the address conversion tables, address conversion table control means for updating the address conversion table managing means to update contents of the address conversion tables, processor managing means for checking whether each processor is operable, a system control processor for managing the entire system, forced clear designating means for causing the processor managing means to designate the system control processor to delete a specific processor No. from the address conversion table managing means in accordance with abnormality information from the processors, and forced control means for causing the system control processor to issue a directory clear request of the specific processor No. to the address conversion table control means in accordance with the designation from the forced clear designating means.

According to still another aspect of the present invention, there is provided an information processing apparatus comprising a plurality of processors for performing arithmetic operations for information processing, a memory unit to be commonly accessed by the processors, a plurality of address conversion tables for converting a logic address constituted by a partial space No., a page No., and an intrapage address into a physical address, address conversion table managing means having directories in correspondence with the address conversion tables, the directories managing the address conversion tables in accordance with the partial space No. of the logic address and an accessible processor designation bit indicating processors accessible to the address conversion tables, address conversion table control means for updating the address conversion table managing means to update contents of the address conversion tables, processor managing means for checking whether each processor is operable, and forced control means for causing the processor managing means to issue a directory clear request for deleting a specific processor No. from the address conversion table managing means to the address conversion table control means in accordance with abnormality information from the processors.

BRIEF DESCRIPTION OF THE DRAWINGS

FIG. 10 is a block diagram showing a main part of the second embodiment of the present invention; and FIG. 11 is a block diagram showing a main part of the third embodiment of the present invention.

DETAILED DESCRIPTION OF THE PREFERRED EMBODIMENTS

Embodiments of the present invention will be described below with reference to the accompanying drawings.

Figure 1:
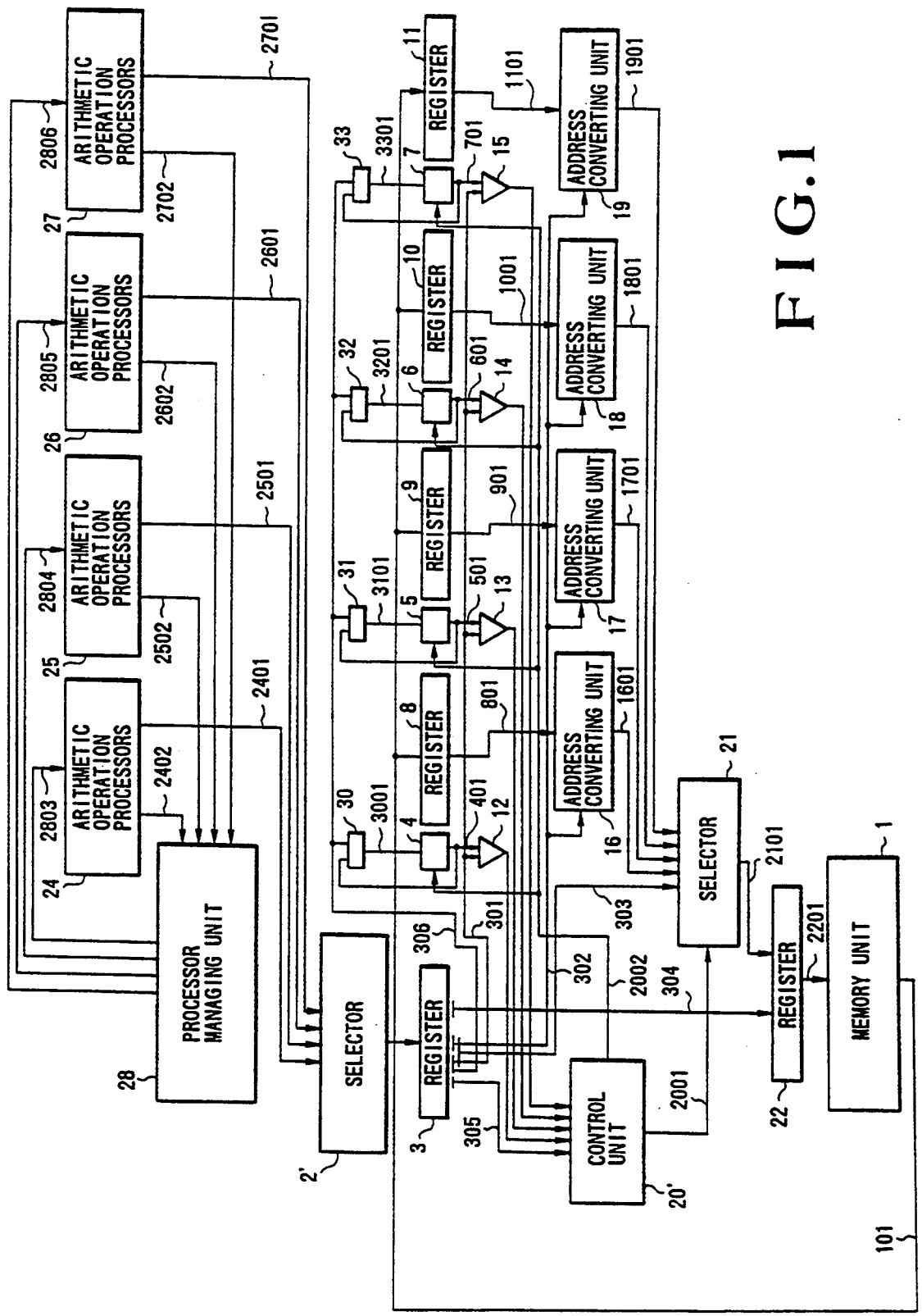
FIG. 1 is a block diagram showing the first embodiment of the present invention.

FIG. 1 shows an arrangement of the first embodiment of the present invention. Referring to FIG. 1, reference numeral 1 denotes a memory unit; 2' and 21, selectors; 3, 8 to 11, and 22, registers; 4 to 7, directories; 12 to 15, comparing units; 16 to 19, address converting units; 20', a control unit; 24 to 27, arithmetic operation processors; 28, a processor managing unit; and 30 to 33, directory updating units.

Figure 2:
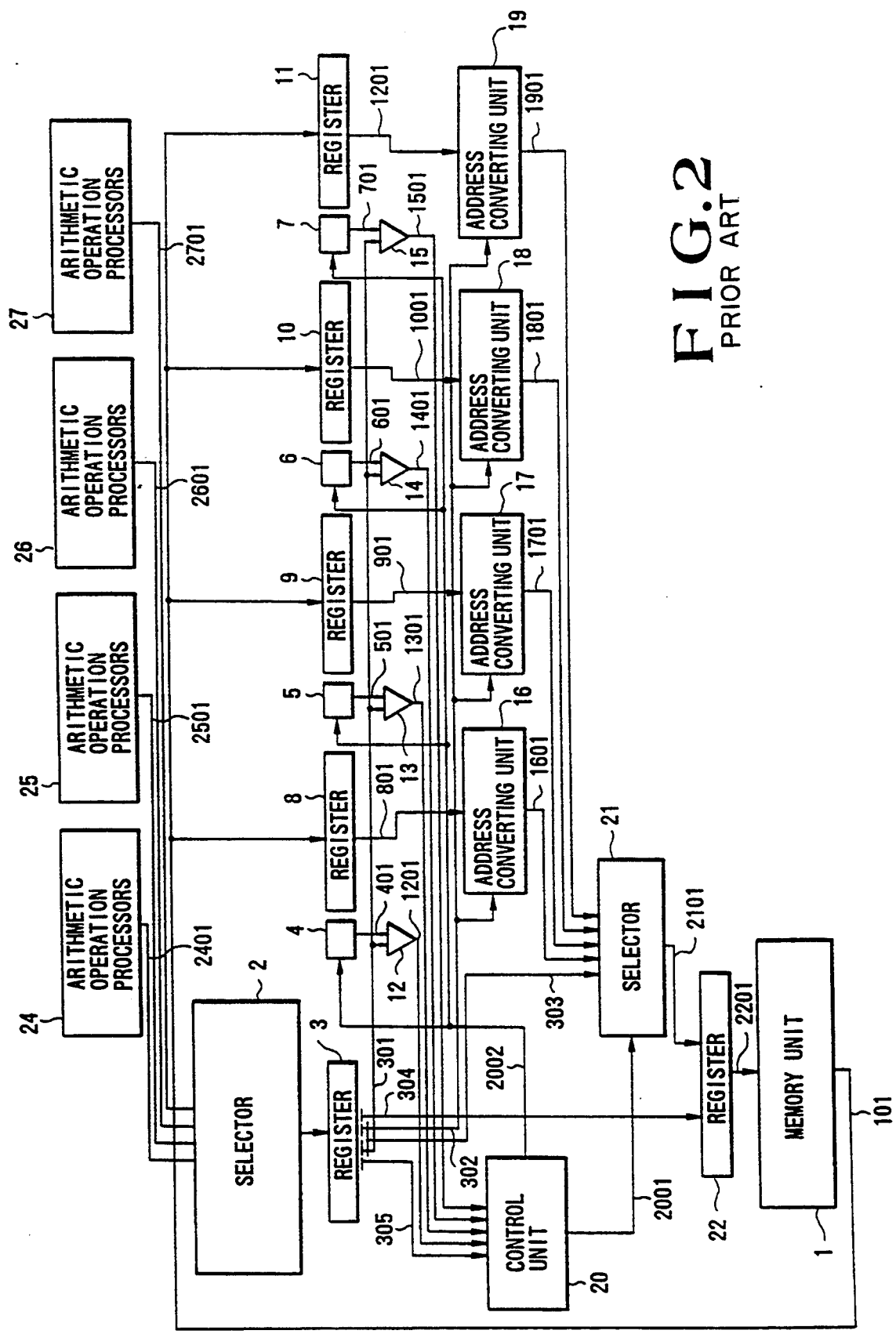
FIG. 2 is a block diagram showing a prior art.
Figure 3:
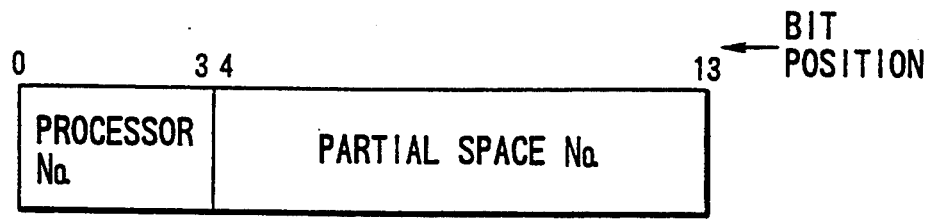
FIG. 3 is a view showing a format of a directory of the present invention.
Figure 4:
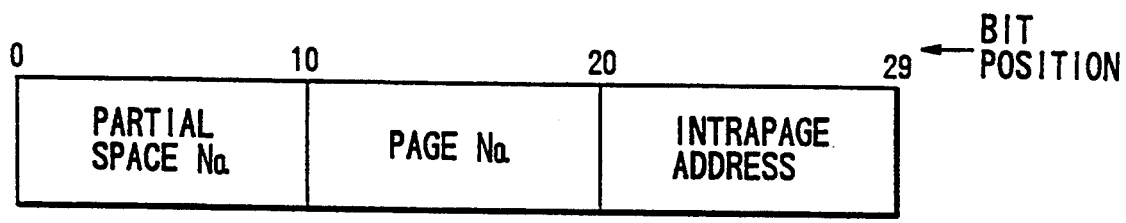
FIG. 4 is a view showing a format of a logic address.

Note that in FIG. 1, the same reference numerals as in FIG. 2 denote parts having the same functions, and a part denoted by reference numeral suffixed with ' is functionally advanced from the same part in the prior art shown in FIG. 2.

In the embodiment shown in FIG. 1, access to the memory unit 1 and registration and delete processing for the directories 4 to 7 and the address converting units 16 to 19 are the same as those of the prior art.

Deletion of an address conversion table from the directories 4 to 7 performed when one of the arithmetic operation processors 24 to 27 causes an abnormality will be described below.

When an abnormality is detected in one of the arithmetic operation processors 24 to 27, this detection is reported to the processor managing unit 28 through a corresponding one of lines 2402, 2502, 2602, and 2702. When the processor managing unit 28 receives the abnormality report, it checks the No. of a processor which causes the abnormality and an internal processor managing register 2810 for managing operable processors.

Figure 9:
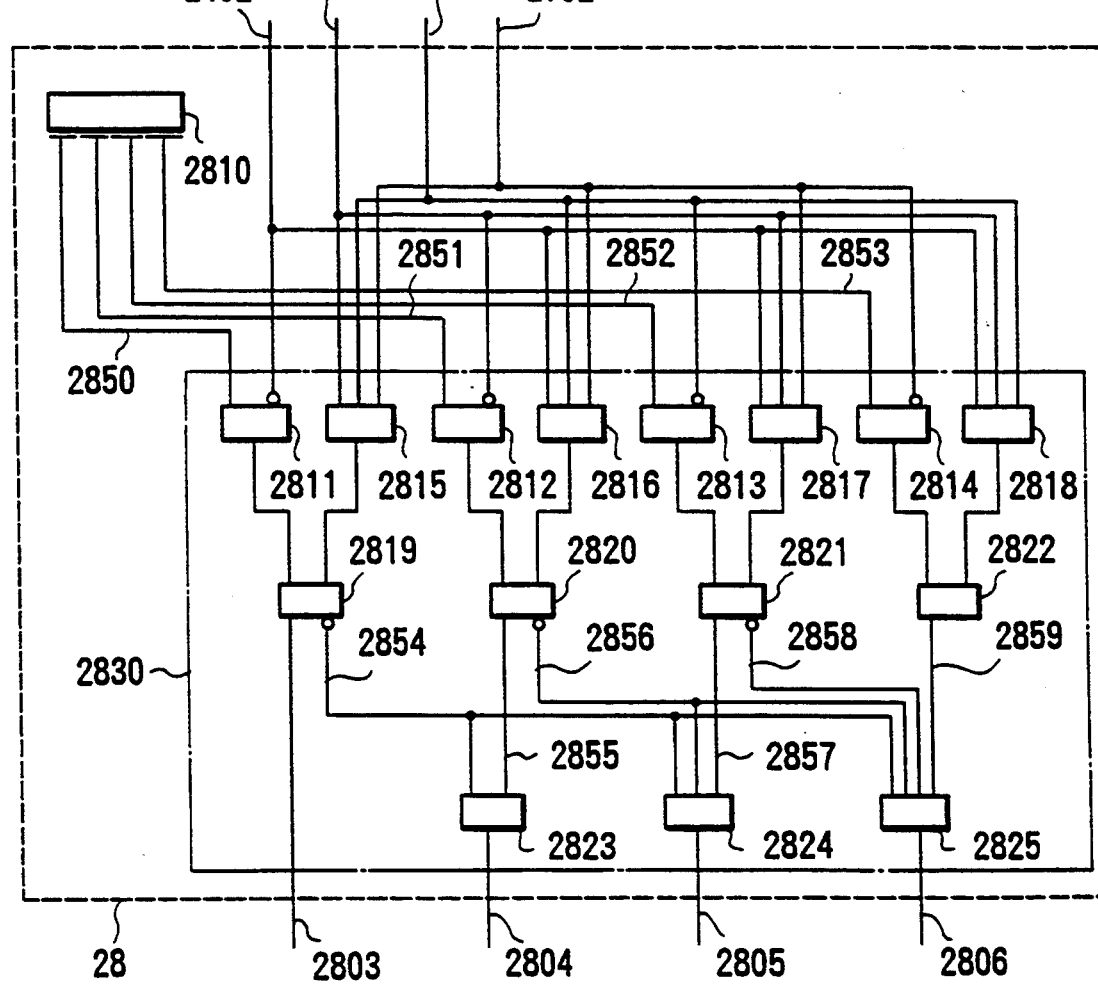
FIG. 9 is a block diagram showing an arrangement of a processor managing unit.

FIG. 9 shows an arrangement of the processor managing unit. Referring to FIG. 9, in accordance with the abnormality sent from the arithmetic operation processors 24 to 27 through the lines 2402, 2502, 2602, and 2702, a forced clear request output unit 2830, which can recognize currently operable processors indicated by the processor managing register 2810 and performs forced clear processing for an address conversion table, determines one of the arithmetic operation processors 24 to 27 to which a forced clear request is to be output and outputs the processor No. of a processor which causes the abnormality and a request for the clear processing for the directory. In this determination of one of the arithmetic operation processors 24 to 27 to be subjected to the directory clear processing, one of the operable processors indicated by the processor managing register 2810 and having the smallest processor No. is selected.

Figure 5:
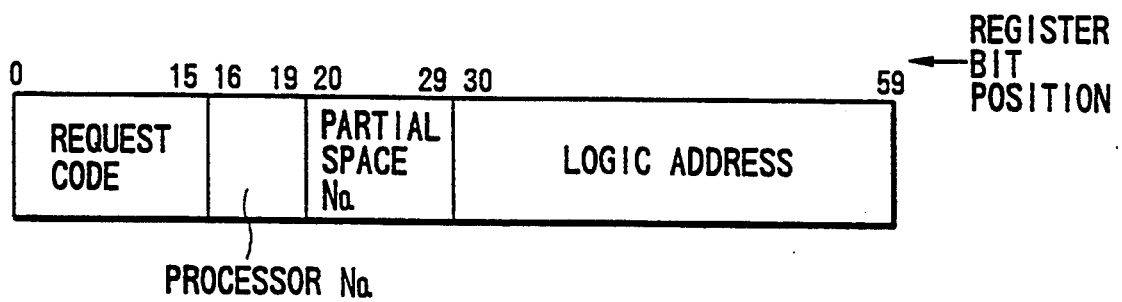
FIG. 5 is a view showing a format of a register 3.

When the arithmetic processors 24 to 27 receive the clear designation for the directory from the processor managing unit 28 through the lines 2803 to 2806, respectively, they control a selector 2' to select the processor No. of the processor which causes the abnormality and the request code for clearing the directory through lines 2401, 2501, 2601, and 2701 and set the processor No. and the request code in a register 3. The register 3 sets the request code in bits 0 to 15 and the processor No. in bits 16 to 19 shown in FIG. 5, and bits from the bit 20 remain "0".

The register 3 supplies an instruction code to a control unit 20' through a line 305. The control unit 20' performs delete processing of the processor No. for the directories 4 to 7 by checking a coincidence between not the partial space Nos. but only the processor Nos. of the register 3 and the directories 4 to 7, unlike normal delete processing.

Figure 6:
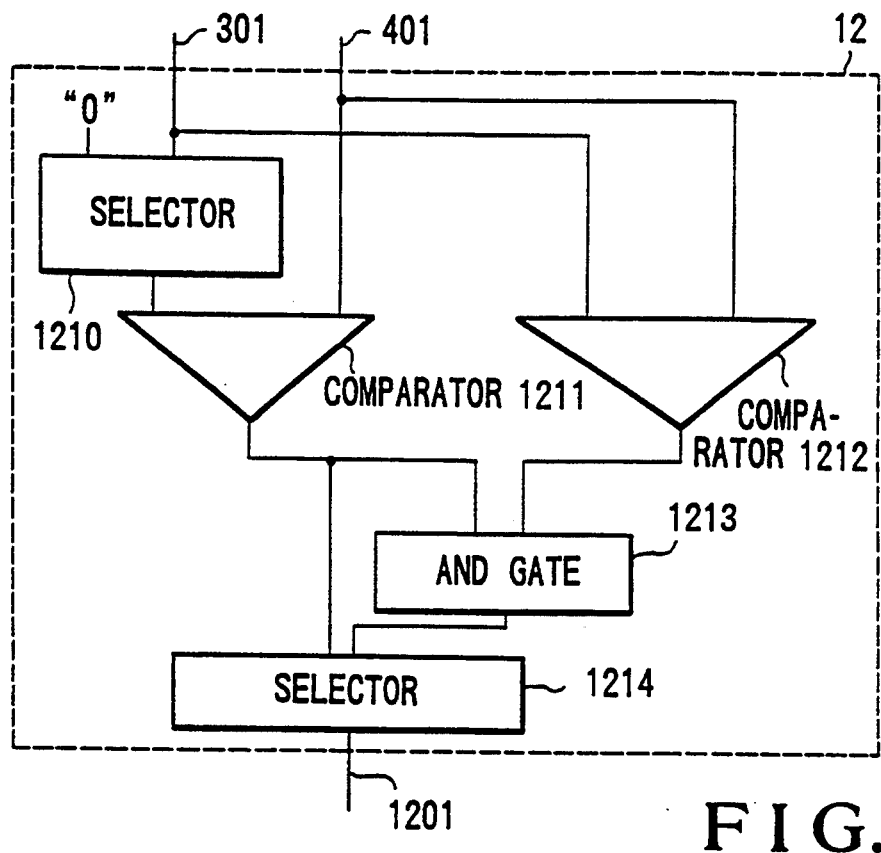
FIG. 6 is a block diagram showing an arrangement of a comparing unit.
Figure 7:
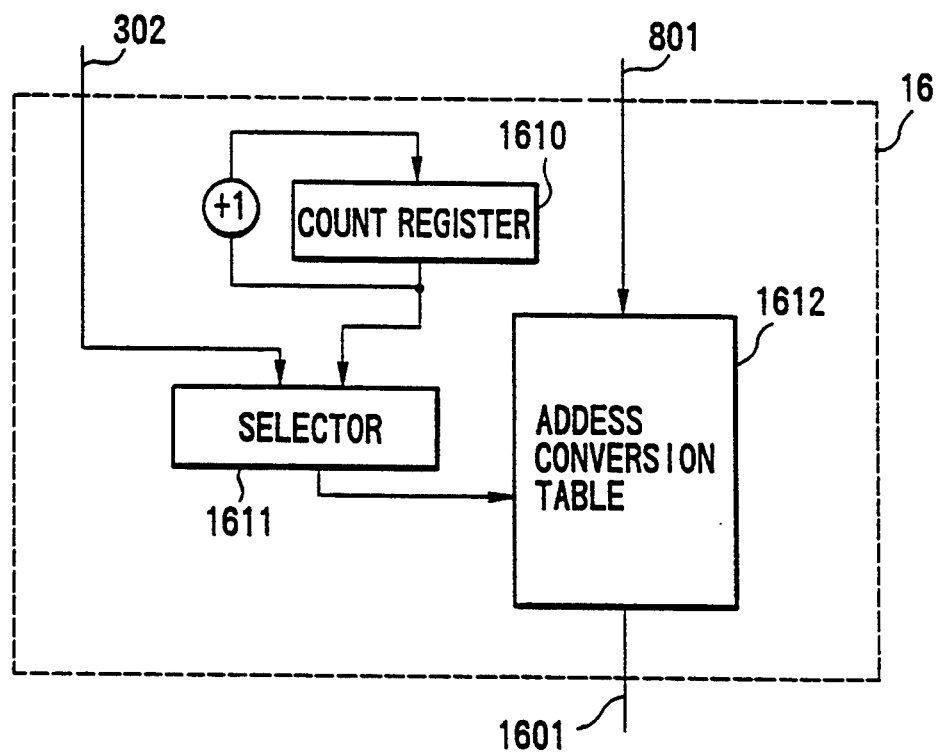
FIG. 7 is a block diagram showing an arrangement of an address converting unit.

As shown in FIG. 6, the comparing unit 12 checks a coincidence between the processor No. from the line 305 and that of the directory 4 in accordance with a comparator 1211, and the check result is selected not through an AND gate 1213 but directly by a selector 1214 and reported to the control unit 20'. The comparing units 13 to 15 similarly perform the processing and report the results to the control unit 20'.

At the same time, the processor Nos. of the directories 4 to 7 are supplied to the directory updating units 30 to 33 through lines 401, 501, 601, and 701, and the processor No. of the processor which causes the abnormality is supplied from the register 3 to the directory updating units 30 to 33 though a line 306.

The directory updating units 30 to 33 reset the processor No. of the register 3 in accordance with the processor Nos. from the directories 4 to 7 and send the reset processor Nos. to the directories 4 to 7 through lines 3001, 3101, 3201, and 3301, respectively.

Figure 8:
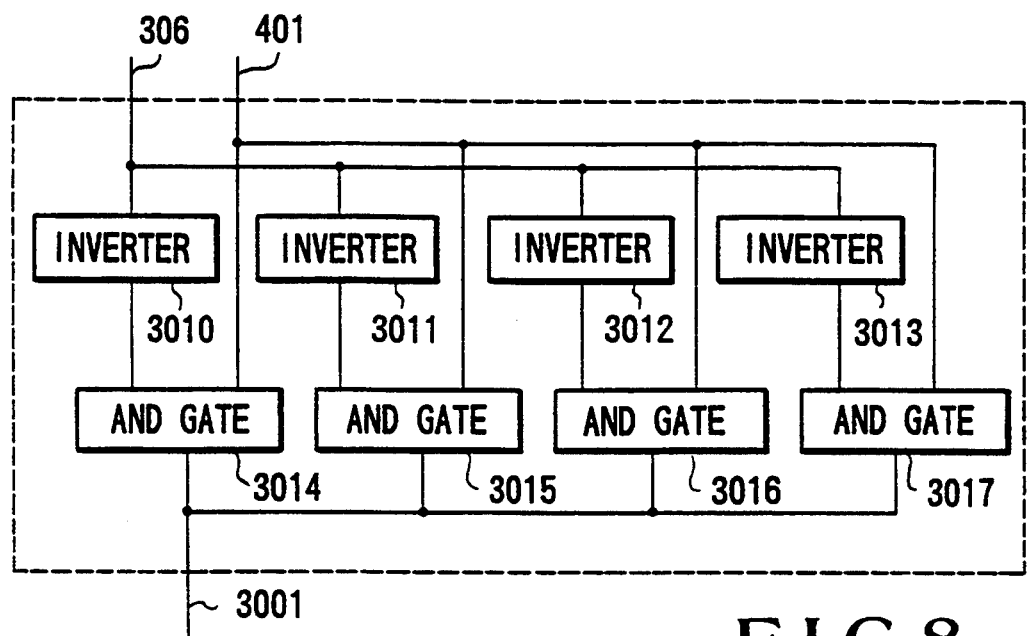
FIG. 8 is a block diagram showing a directory updating unit.

FIG. 8 shows the directory updating unit 30. Referring to FIG. 8, of the processor No. from the line 306, the bits 16, 17, 18, and 19 of the register 3 are inverted by inverters 3010, 3011, 3012, and 3013 and supplied to AND gates 3014, 3015, 3016, and 3017, respectively. Of the processor No. from the line 401, the bits 0, 1, 2, and 3 of the directory 4 are supplied to the AND gates 3014, 3015, 3016, and 3017. The logical products from the AND gates 3014 to 3017 are supplied to the line 3001. The directory updating units 31 to 33 have the same arrangement as that of the directory updating unit 30.

The control unit 20' sends a set signal to one of the directories 4 to 7, the coincidence of which is reported by a corresponding one of the comparing units 12 to 15, to fetch the data from a corresponding one of the updating units 30 to 33 and ends the processing.

Assuming that "0100" is set as the processor No. of the directory 4, "1000", "1100", and "0010" are set as the processor Nos. of the directories 5 to 7, respectively, and all the arithmetic operation processors are operable, i.e., "1111" is set in the processor managing register 2810, an operation performed when the arithmetic operation processor 25 causes an abnormality in this state will be described in detail below.

When an abnormality is detected from the arithmetic operation processor 25, this detection is reported to the processor managing unit 28 through the line 2502. When the processor managing unit 28 receives the report indicating the abnormality in the arithmetic operation processor 25, it causes the forced clear request output unit 2830 to perform processing to determine a processor No. to be subjected to clear processing of a directory in accordance with the state "1111" of the processor managing register 2810 and the abnormality report "0100" from the arithmetic operation processors 24 to 27.

In accordance with the processor state "1111" from the processor managing register 2810, the forced clear request unit 2830 fetches "1" in each of AND gates 2811 to 2814 through lines 2850 to 2853, respectively.

The AND gate 2811 fetches "1" of the line 2850 and an inversion "1" of "0" from the line 2402 and sends "1" to an AND gate 2819. The AND gate 2812 fetches "1" of the line 2851 and an inversion "0" of "1" from the line 2502 and sends "0" to an AND gate 2820. The AND gate 2813 fetches "1" of the line 2852 and an inversion "1" of "0" from the line 2602 and sends "1" to an AND gate 2821. The AND gate 2814 fetches "1" of the line 2853 and an inversion "1" of "0" from the line 2702 and sends "1" to an AND gate 2822. An OR gate 2815 receives "1", "0", and "0" from the lines 2502, 2602, and 2702, respectively, and sends "0" to the AND gate 2819. An OR gate 2816 receives "0", "0", and "0" from the lines 2402, 2602, and 2702, respectively, and sends "0" to the AND gate 2820. An OR gate 2817 receives "0", "1", and "0" from the lines 2402, 2502, and 2702, respectively, and sends "1" to the AND gate 2821. An OR gate 2818 receives "0", "1", and "0" from the lines 2402, 2502, and 2602, respectively, and sends "1" to the AND gate 2822. In accordance with "1" from the AND gate 2811 and "1" from the OR gate 2815, the AND gate 2819 sends "1" to a line 2803 and "0" to AND gates 2823 to 2825 through a line 2854. In accordance with "0" from the AND gate 2812 and "0" from the OR gate 2816, the AND gate 2820 sends "0" to the AND gate 2823 through a line 2855 and "1" to the AND gates 2824 and 2825 through a line 2856. In accordance with "1" from the AND gate 2813 and "1" from the OR gate 2817, the AND gate 2821 sends "1" to the AND gate 2824 through a line 2857 and "0" to the AND gate 2825 through a line 2858. In accordance with "1" from the AND gate 2814 and "1" from the OR gate 2818, the AND gate 2822 sends "1" to the AND gate 2825 through a line 2859.

In accordance with "0" from the line 2854 and "0" from the line 2855, the AND gate 2823 sends "0" to the line 2804. In accordance with "0", "1", and "1" from the lines 2854, 2856, and 2857, respectively, the AND gate 2824 sends "0" to the line 2805. In accordance with "0", "1", "0" and "1" from the lines 2854, 2856, 2858, and 2859, respectively, the AND gate 2825 sends "0" to the line 2806.

In this manner, the clear processing designation of a directory is sent to the arithmetic operation processor 24, and at the same time the processor No. of the processor which causes the abnormality is sent through the line 2803 (this operation is not shown in FIG. 9).

When the arithmetic operation processor 24 receives the directory clear designation from the processor managing unit through the line 2803, it sets a request code for clearing the processor No. and the directory of the processor which causes the abnormality in the register 3 via the selector 2' through the line 2401.

The register 3 sends the request code to the control unit 20' and the processor No. "0100" to the comparing units 12 to 15 through the line 301. The comparing unit 12 compares the processor No. "0100" of the directory 4 with the processor No. "0100" from the line 301, and the comparing units 13 to 15 compare the processor Nos. "1000", "1100", and "0010" of the directories 5 to 7 with the processor No. "0100" from the line 301, respectively. The comparing units 12 and 14 detect coincidences and report the detection results to the control unit 20' through the lines 1201 and 1401, respectively (in this comparison, a coincidence is detected when "1" is set in the same bit position).

The processor No. "0100" of the register 3 is supplied to the directory updating units 30 to 33 through the line 306. The directory updating units 30 to 33 set "0" in a bit position at which a coincidence is found between the processor No. "0100" from the line 306 and the processor Nos. "0100", "1000", "1100", and "0010" of the directories 4 to 7, respectively. The directory updating unit 30 will be described with reference to FIG. 8. "0", "1", "0", and "0" of the processor No. "0100" from the line 306 are supplied to the inverters 3010, 3011, 3012, and 3013, respectively, and "1", "0", "1", and "1" are supplied to the AND gates 3014 to 3017, respectively. "0", "1", "0", and "0" of the processor No. "0100" from the line 401 are supplied to the AND gates 3014, 3015, 3016, and 3017, respectively, and "0", "0", "0", and "0" are output from the AND gates 3014 to 3017 onto the line 3001. The same processing is performed in the directory updating units 31 to 33, and "1000", "1000", and "0010" are supplied to the lines 3101, 3201, and 3301, respectively.

In accordance with the coincidence reports from the lines 1201 and 1401, the control unit 20' designates the directories 4 and 6 to set the results from the directory updating units 30 and 32.

Therefore, "0000" is set as the processor No. of the directory 4 and "1000", "1000", and "0010" are set in the processor Nos. of the directories 5 to 7, respectively. That is, the processor No. of the processor which causes the abnormality is reset from all the directories 4 to 7, and the processing is ended.

The second embodiment of the present invention will be described below with reference to a block diagram shown in FIG. 10

The second embodiment differs from the first embodiment in that a request code for performing registration/delete of an address conversion table and a processor No. are set in a register 3 not by one of arithmetic operation processors 24 to 27 but by a control processor 29 additionally provided to a system. When an abnormality is detected in the arithmetic operation processors 24 to 27, this detection is reported to a processor managing unit 28 through lines 2402, 2502, 2602, and 2702, as in the first embodiment. When the processor managing unit 28 receives the abnormality report from the arithmetic operation processors 24 to 27, it sends a processor No. of the processor which causes the abnormality and a clear processing request for a directory of the processor to the control processor 29 through a line 2802. When the directory clear designation and the abnormal processor No. are supplied from the processor managing unit 28, the control processor 29 causes a selector 2' to select the request code and the processor No. through a line 2901 and sets them in a register 3 in order to delete registration of address conversion tables for directories 4 to 7 and address converting units 16 to 19. The subsequent operation is the same as in the first embodiment and a detailed description thereof will be omitted.

The third embodiment of the present invention will be described below with reference to a block diagram shown in FIG. 11.

The third embodiment differs from the first embodiment in that a processor managing unit 28 sets a request code and a processor No. in a register 3. When an abnormality is detected in arithmetic operation processors 24 to 27, this detection is reported to a processor managing unit 28 through lines 2402, 2502, 2602, and 2702.

When the processor managing unit 28 receives the abnormality report from the arithmetic processors 24 to 27, it causes a selector 2' to select a processor No. of the processor which causes the abnormality and a request code for directory clear processing through a line 2801 and sets them in a register 3.

According to the present invention as has been described above, if a processor causes an abnormality in a multiprocessor arrangement, a bit located in a processor No. in a directory of an address conversion table and corresponding to the processor which causes the abnormality is reset by other normal processors, thereby preventing a reduction in use efficiency of address conversion tables and an overhead caused by address conversion table registration performed a large number of times due to a reduction in number of address conversion tables.

What is claimed is:

1. An information processing apparatus comprising:
    a plurality of processors for performing arithmetic operations for information processing;
    a memory unit to be accessed commonly by said processors;
    a plurality of address conversion tables for converting a logical address into a physical address;
    a plurality of address conversion table managing modules each having a directory for managing a corresponding address conversion table in accordance with contents of a logical address and numbers (Nos.) of processors accessible to said address conversion tables;
    address conversion table control means for updating said address conversion table managing modules to update contents of said address conversion tables;
    processor managing means for checking whether each processor is operable; and
    abnormality processing means for deleting an inoperable processor number (No.) from a directory of an address conversion table managing module in accordance with abnormality information from said processors, wherein said abnormality processing means includes forced clear designating means for designating said inoperable processor No. for deletion from said plurality of address conversion table managing modules, and forced control means of an operable processor, for sending said inoperable processor No. and a directory clear request to said address conversion table control means in accordance with the designation from said forced clear designating means.

2. An apparatus according to claim 1,
    further comprising a system control processor for managing the entire system, and
    wherein said abnormality processing means comprises forced clear designating means for designating said system control processor to delete the specific processor No. from said address conversion table managing means, and forced control means of said system control processor, for sending the specific processor No. and a directory clear request to said address conversion table control means in accordance with the designation from said forced clear designating means.

3. An apparatus according to claim 1, wherein said abnormality processing means comprises forced control means for receiving abnormality information from said processors and sending the specific processor No. and a directory clear request directly to said address conversion table control means.

4. An apparatus according to claim 1, wherein said logical address is constituted by a partial space No., a page No., and an intrapage address, and said directories manage said address conversion tables using said partial space Nos.

5. An apparatus according to claim 1, wherein a No. of accessible processors is constituted by accessible processor designation bits, and said directories manage said address conversion tables using partial space Nos.

6. An apparatus according to claim 1, wherein said directories are provided in correspondence with said address conversion tables.

7. An information processing apparatus comprising:

a plurality of processors for performing arithmetic operations for information processing;

a memory unit to be commonly accessed by said processors;

a plurality of address conversion tables for converting a logical address constituted by a partial space number (No.), a page No., and an intrapage address into a physical address;

a plurality of address conversion table managing modules each including a directory for a corresponding address conversion table, said directories managing said address conversion tables in accordance with the partial space No. of a logical address and an accessible processor designation bit indicating a processor accessible to said address conversion tables;

address conversion table control means for updating said address conversion table managing modules to update contents of said address conversion tables;

processor managing means for checking whether each processor is operable;

forced clear designating means for designating an operable processor based on information from said processor managing means to carry out deletion of an inoperable processor No. from said plurality of address conversion table managing modules in accordance with abnormality information from said processors; and forced control means for causing said operable processor to issue a directory clear request to said address conversion table control means in accordance with the designation from said forced clear designating means.

8. An information processing apparatus comprising:

a plurality of processors for performing arithmetic operations for information processing;

a memory unit to be commonly accessed by said processors;

a plurality of address conversion tables for converting a logical address constituted by a partial space number (No.), a page No., and an intrapage address into a physical address;

a plurality of address conversion table managing modules each having a directory for a corresponding address conversion table, said directories managing said address conversion tables by a partial space No. of a logical address and an accessible processor designation bit indicating processors accessible to said address conversion tables;

address conversion table control means for updating said address conversion table managing modules to update contents of said address conversion tables;

processor managing means for checking whether each processor is operable;

a system control processor for managing the entire system;

forced clear designating means for causing said processor managing means to designate said system control processor to carry out deletion of an inoperable processor No. from said plurality of address conversion table managing modules in accordance with abnormality information from said processors; and forced control means for causing said system control processor to issue a directory clear request of the inoperable processor No. to said address conversion table control means in accordance with the designation from said forced clear designating means.

9. An information processing apparatus comprising:

a plurality of processors for performing arithmetic operations for information processing;

a memory unit to be commonly accessed by said processors;

a plurality of address conversion tables for converting a logical address constituted by a partial space number (No.), a page No., and an intrapage address into a physical address;

a plurality of address conversion table managing modules each having a directory for a corresponding address conversion table, said directories managing said address conversion tables in accordance with the partial space No. of a logical address and an accessible processor designation bit indicating processors accessible to said address conversion tables;

address conversion table control means for updating said address conversion table managing modules to update contents of said address conversion tables;

processor managing means for checking whether each processor is operable; and forced control means for causing said processor managing means to issue a directory clear request for deleting an inoperable processor No. from said plurality of address conversion table managing modules to said address conversion table control means in accordance with abnormality information from said processors.

* * * * *